United States Patent [19]

Nakai et al.

[11] Patent Number: 5,014,826
[45] Date of Patent: May 14, 1991

[54] APPARATUS FOR MAINTAINING AN AIR GAP IN A TOROIDAL TYPE LINEAR MOTOR

[75] Inventors: Keiichiro Nakai, Tokyo; Yoshinori Nakanishi, Shibayama, both of Japan

[73] Assignee: Otis Elevator Company, Farmington, Conn.

[21] Appl. No.: 494,057

[22] Filed: Feb. 26, 1990

[30] Foreign Application Priority Data

Feb. 28, 1989 [JP] Japan .................................. 1-49722

[51] Int. Cl.$^5$ ................................................ B66B 1/06
[52] U.S. Cl. ...................................... 187/112; 187/94; 318/135
[58] Field of Search ...................... 187/17, 94, 95, 112; 318/135

[56] References Cited

U.S. PATENT DOCUMENTS

| 901,205 | 10/1908 | Stoffels | 187/95 |
| 2,482,458 | 9/1949 | Bouton | 187/112 |
| 2,483,895 | 10/1949 | Fisher | 318/135 |
| 4,219,301 | 8/1980 | Freeman | 187/17 |

FOREIGN PATENT DOCUMENTS

| 3634061 | 4/1988 | Fed. Rep. of Germany | 187/17 |
| 0051648 | 4/1977 | Japan | 187/17 |
| 0051163 | 4/1979 | Japan | 187/17 |

Primary Examiner—Robert P. Olszewski
Assistant Examiner—Steven Kennemore
Attorney, Agent, or Firm—Lloyd D. Doigan

[57] ABSTRACT

A supporting member is fixed to the moving element of a toroidal type linear motor, the support member being maintained a predetermined distance from a stationary element to maintain a predetermined annular air gap between the stationary and moving member. The supporting member may comprise a plurality of rollers which are rotatably provided on the top and bottom of the moving element, the rollers being so arranged as to be radially spaced from the stationary element. The distance between the rollers and the stationary element is less than the distance between the stationary and moving elements.

3 Claims, 3 Drawing Sheets

FIG.2
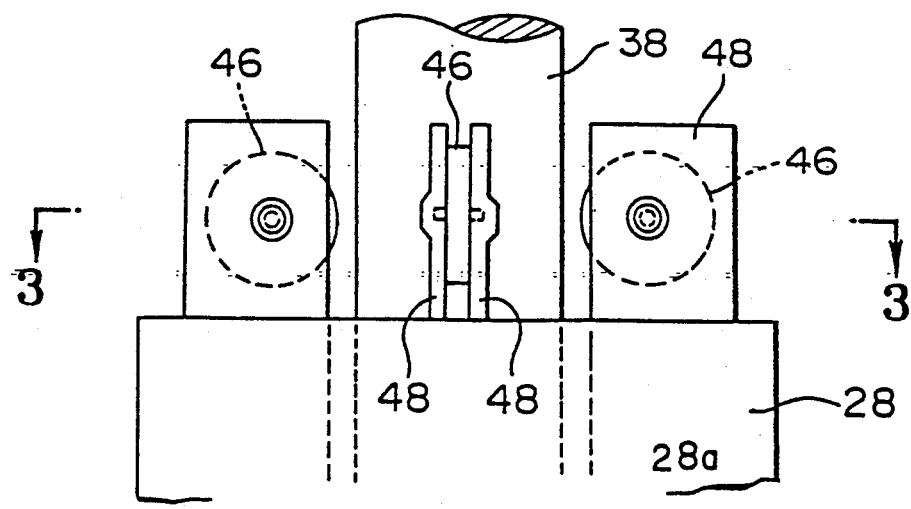
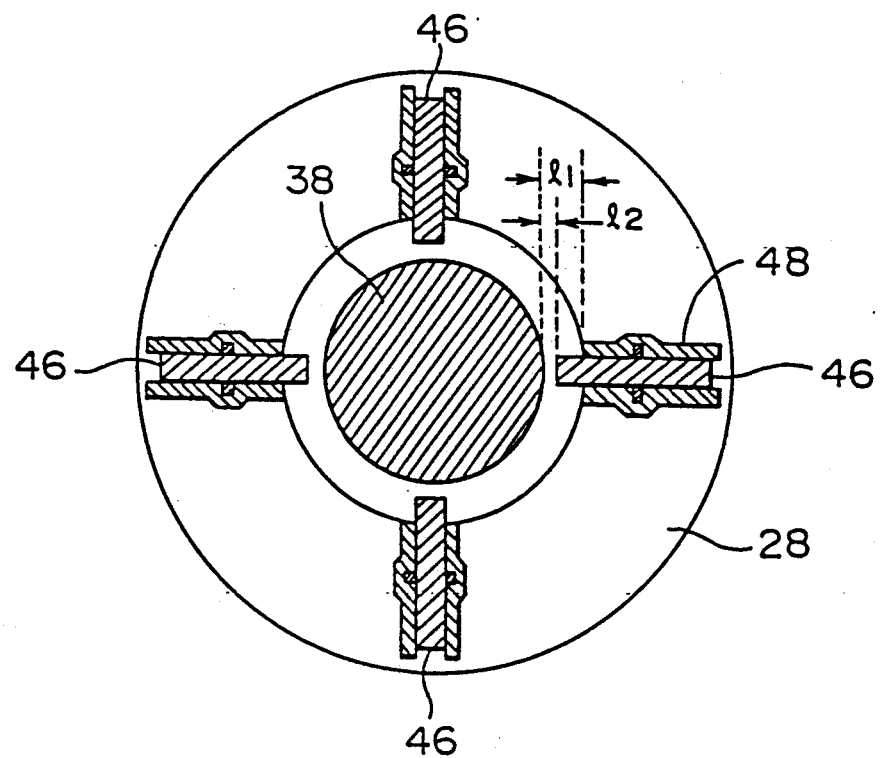
FIG.3

FIG.4
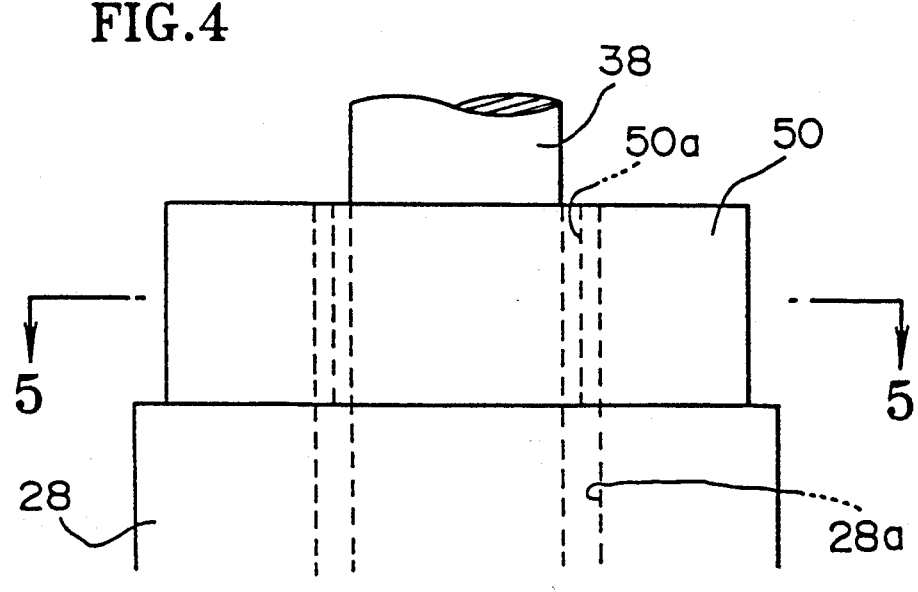
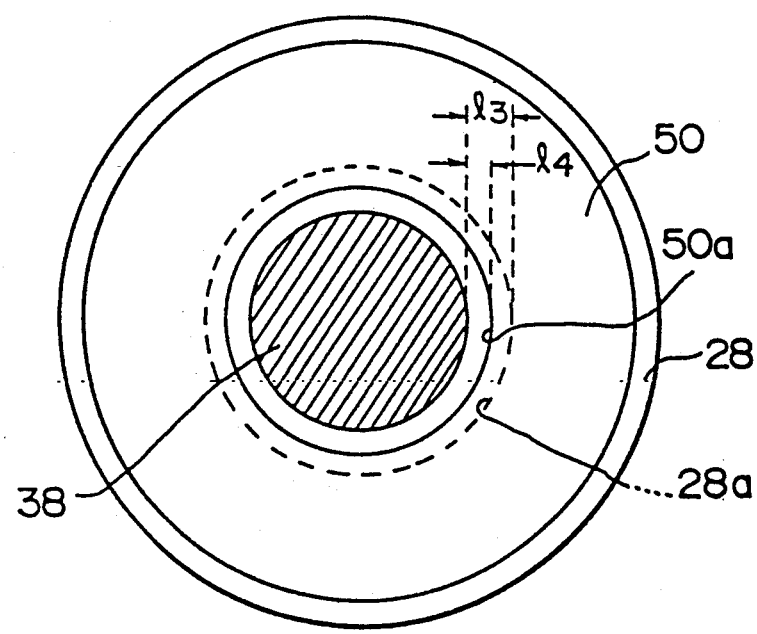
FIG.5

APPARATUS FOR MAINTAINING AN AIR GAP IN A TOROIDAL TYPE LINEAR MOTOR

DESCRIPTION

1. Technical Field

The invention relates to an apparatus for maintaining an air gap in a toroidal type linear motor utilized to drive an elevator.

2. Background Art

As is well known, toroidal type linear motors comprise a moving element having a cylindrical opening and a stationary element disposed within the cylindrical opening. An air gap is maintained between the moving element and the stationary element due to magnetic forces produced therebetween.

An elevator may be driven by such a motor. Typically, a vertically extending column fixed to a building is used as a stationary element. The moving element may be incorporated in a counterweight or elevator cab to move along the column. Ropes, which connect the car and counterweight, are guided by sheaves which are rotatably fixed to an upper portion of the building. In normal operation, while the elevator car moves upwardly and downwardly, relatively even magnetic forces between the column and the moving element maintain a predetermined gap therebetween. However, when the elevator car is stopped, no magnetic force is exerted between the column and the moving element, so that the air gap may not be maintained. In addition, in abnormal operation, as when an impact or vibration is applied to the column, the air gap may not be maintained. Therefore, in some conventional elevators driven by toroidal type linear motors, a plurality of roller are rotatably fixed to the top and bottom surfaces of the moving element. The rollers rotate and move on the columns so as to maintain the predetermined air gap.

However, in such elevators, rotation of the rollers tends to cause noise as the car moves. Moreover, because a column is formed of a plurality of connected portions, noise occurs as the rollers pass over the connecting joints of the column. Such noise may cause discomfort to elevator occupants.

DISCLOSURE OF THE INVENTION

It is an object of the invention to provide an apparatus for maintaining an air gap in a toroidal type linear motor.

It is a further object of the invention to provide an apparatus for maintaining an air gap in a toroidal type linear motor while decreasing noise as the motor moves upwardly and downwardly.

According to the invention a supporting member is fixed to the moving element of a toroidal type linear motor, the support element being maintained a predetermined distance from a stationary element when the predetermined annular air gap is maintained. The supporting member may comprise a plurality of rollers which are rotatably provided on the top and bottom of the moving element, the rollers being so arranged as to be radially spaced from the stationary element. The distance between the rollers and the stationary element is less than the distance between the stationary and moving elements.

According to an further aspect of the invention, the supporting member may comprise an annular member fixed to the top and bottom surfaces of the moving element. The inner diameter of the annular member is greater than the outer diameter of the stationary element and is less than the inner diameter of an opening of the moving element which receives the stationary element.

When magnetic force is exerted between the moving and stationary elements, the predetermined annular air gap is usually maintained therebetween, so that the supporting member is not brought into contact with the stationary element. As such no noise occurs due to contact with the support member with a moving element. However, when uneven or no magnetic force is exerted between the moving and stationary elements, or when an impact or vibration is applied to the stationary element, the supporting member may come into contact with the stationary element to prevent the air gap from decreasing below a predetermined value.

These and other objects of the present invention will become more apparent in light of the detailed description of a best mode embodiment thereof, as illustrated in the accompanying drawing.

BRIEF DESCRIPTON OF THE DRAWING

FIG. 2 is a view illustrating in an embodiment of an apparatus for maintaining the air gap in the linear motor of FIG. 1;

FIG. 3 is a sectional view taken along the line 3—3 of FIG. 2;

FIG. 4 is a second embodiment of an apparatus for maintaining the air gap in the linear motor used in the elevator of FIG. 1; and FIG. 5 is a sectional view taken along the line 5—5 of FIG. 4.

BEST MODE FOR CARRYING OUT THE INVENTION

Figure 1:
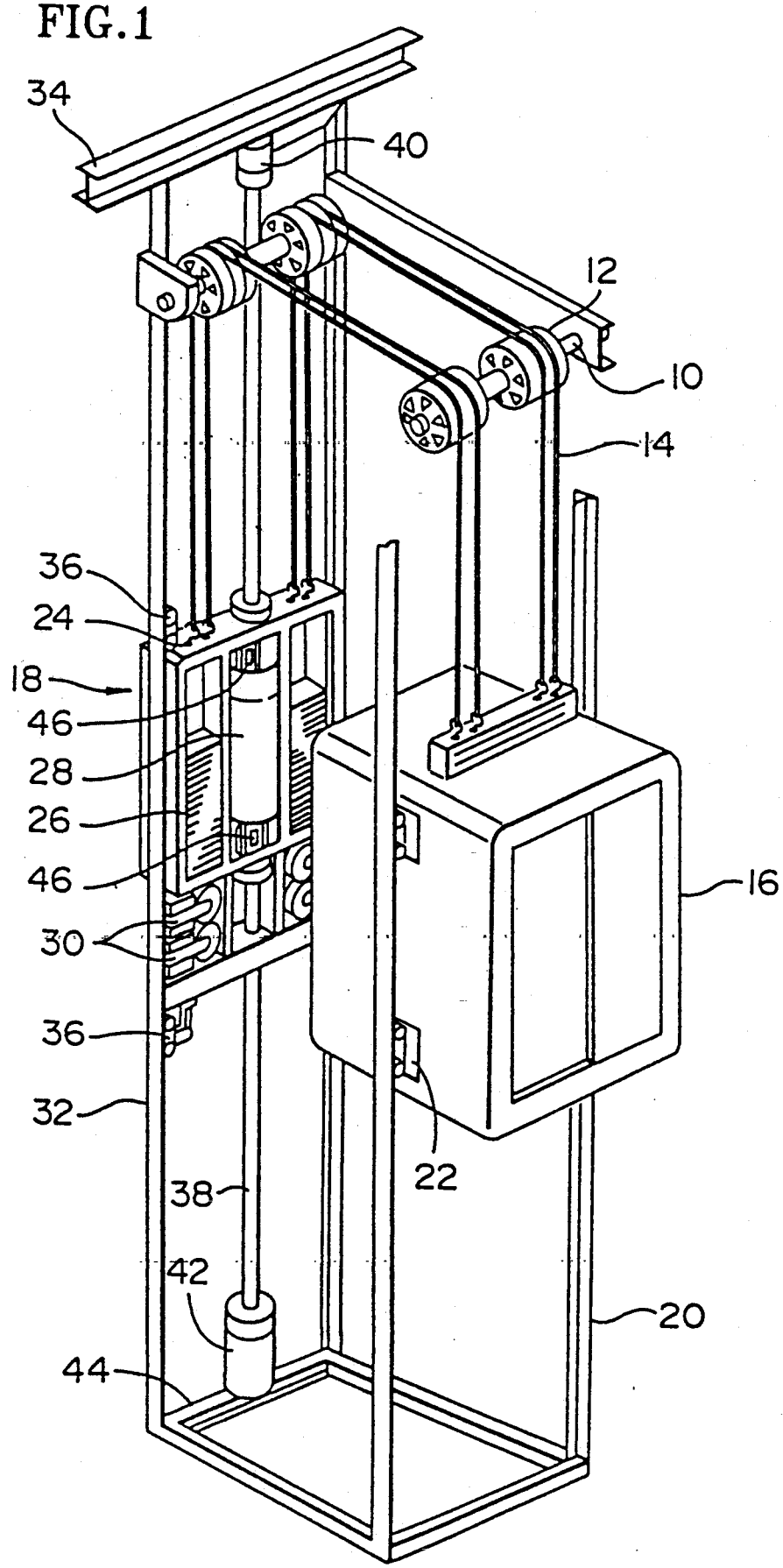
FIG. 1 is a perspective view of an elevator driven by a linear motor according to the present invention.

Referring to FIG. 1, a pair of support shafts 10 are arranged in parallel on an upper portion of a building (not shown). Each of the supporting shafts 10 has a pair of sheaves rotatably mounted thereon, the sheaves being arranged in parallel to each other. Ropes 14 are guided by the sheaves 12. One end of each of the ropes 14 is connected to an elevator car 16. The other end thereof is connected to a counterweight 18. As the elevator car 16 moves upwardly, the counterweight moves downwardly, and conversely when an elevator car moves downwardly, the counterweight moves upwardly.

A pair of vertical rails 20 are fixed to the building on either side of the elevator in parallel to each other. The elevator car 16 is guided along the rails 20 via sliding members 22.

The counterweight 18 is comprises of a rectangular frame 24 and a plurality of weights 26 disposed on the frame. As will be described herein, moving element 28 and a braking device 30 are also supported on the frame 24. The total weight of the counterweight 18 is usually set to be one and one half times the weight of the elevator car 16.

A pair of guide rails 32 are disposed in parallel to each other on both sides of the counterweight 18. The top ends of the rails 32 are fixed to a top supporting channel 34 and the bottom end thereof are fixed to a bottom channel 44. Sliding members 36 are provided on the frame 24 of the counterweight to guide the counterweight along the rails.

The toroidal type linear motor, which provides motive force for the elevator, is comprised of a stationary aluminum alloy column 38 which serves as a secondary conductor, and a toroidal moving element 28 which serves as a primary conductor.

The column 38 extends vertically. The top end of the column 38 is fixed to the top supporting channel 34 via support member 40. The bottom end of the column is fixed to the bottom support channel 44 via col.umn supporting member 42.

The moving element 28 has a cylindrical opening 28a which receives the column 38 therein. As is well known in toroidal type linear motors, a predetermined annular air gap is formed between the stationary and moving elements due to magnetic forces produced therebetween. As shown in FIGS. 2-5, the moving element 28 is designed to move vertically while maintaining a predetermined air gap L1 between the outer surface of the column 38 and the inner surface of the opening 28a of the moving element 28.

When a substantially even magnetic force is not exerted between the column 38 and the moving element 28 or when an impact or vibration is applied to the column 38, the moving element 28 may not be parallel to the column 38, so that the predetermined air gap may not be maintained. In order to maintain the predetermined air gap, four rollers 46 are provided on each of the top and the bottom of the moving element 28. As will be appreciated from the drawings, one of ordinary skill in the art will realize that the view of the top portion of the moving element is identical to the view of the bottom portion of the linear moving element.

According to a first embodiment of the present invention, rollers 46 are rotatably supported between a pair plates 48 which project from the top and bottom surfaces of the moving element 28. The plates are so arranged to separate the rollers from the column by a predetermined distance L2 (see FIG. 3). Therefore, when the air gap between the moving element 28 and the column 38 is decreased, the rollers 46 come into contact with the column 38 so as to prevent the air gap from becoming less than the distance L1−L2. In addition, since the rollers 46 are separated from the column 38 by the predetermined distance L2, when substantially even magnetic force is exerted between the moving element 28 and the column 38 the noise is decreased because rollers 46 are not.in contact with the column 38.

Referring to FIGS. 4 and 5, a second embodiment of an apparatus for maintaining an air gap in a toroidal linear motor is shown. An annular number 50, which is attached to the top and bottom surfaces of the moving element by conventional means (not shown) is substituted for rollers 46. The inner diameter of the through opening 50a of the annular member 50 is greater than the outer diameter of the column 38, and is less than the inner diameter of the through opening 28a of the moving element 28. As such, the annular member member prevents the air gap from being less than L3−L4.

As set forth above, since the rollers fixed upon the moving element are arranged to separate the column from the moving element by a predetermined distance to maintain a predetermined annular air gap, the rollers do not always rotate and move on the column when the counterweight car moves. Therefore, it is possible to prevent noise produced by rotation of the rollers from occurring and to prevent the air gap from decreasing below a predetermined value at the same time. In the case where an annular member is substituted for the rollers, the inner diameter of the opening 50a of the annular member is greater than the outer diameter of the column and is less than the inner diameter of the opening 28a of the moving element. Therefore, the annular member does not come into contact with the column at all while even magnetic force is exerted between the moving element and the column. Accordingly, noise is prevented while preventing the air gap from decreasing below a predetermined value.

Although the invention has been shown and described with the respect to a best mode embodiment thereof, it should be understood by those skilled in the art that the foregoing and various other changes, omissions, and additions in the form and detail thereof may be made therein without departing from the spirit and scope of the invention.

We claim:

1. An apparatus for maintaining an air gap between a movable element and a stationary element in a toroidal type linear motor, the moveable element having a cylindrical opening for receiving the stationary element, said stationary element being spaced from said moveable element a distance A, said apparatus comprising;
   a supporting member fixed to the moving element, said supporting member being spaced from said stationary member a distance B, said distance B being less than distance A, such that said supporting member does not contact said stationary member during normal operation and may contact said stationary member during abnormal operation or if power to said linear motor is shut off such that said air gap is not less than the difference between distance A and distance B.

2. An apparatus as set forth in claim 1, wherein said supporting member comprises;
   a plurality of rollers which are rotatably provided on a top and a bottom of the moving element, said rollers being disposed angularly about said stationary member.

3. An apparatus as set forth in claim 1, wherein said supporting member comprises;
   an annular member fixed to the top and bottom surfaces of the moving element, said annular member having an opening for receiving said stationary element therethrough.

* * * * *

UNITED STATES PATENT AND TRADEMARK OFFICE
CERTIFICATE OF CORRECTION

PATENT NO. : 5,014,826

DATED : May 14, 1991

INVENTOR(S) : Keiichiro Nakai, et al

It is certified that error appears in the above-identified patent and that said Letters Patent is hereby corrected as shown below:

Column 1, line 35, please delete the word "roller" and in lieu insert the word --rollers--;

Column 1, line 65, please delete the word "an" and in lieu insert the word --a--.

Column 2, line 55, please delete the word "comprises" and in lieu insert the word --comprised--.

Column 3, line 9, please delete the word "col.umn" and in lieu insert the word --column--;

Column 3, line 48, please delete the words"not.in" and in lieu insert the words --not in--;

Column 3, line 52, please delete the word "number" and in lieu insert the word --member--.

Column 4, line 1, after the word "member", please delete the word --member";

Column 4, line 34, please delete the word "moveable" and in lieu insert the word --movable".

Signed and Sealed this

Twenty-second Day of September, 1992

Attest:

DOUGLAS B. COMER

*Attesting Officer*     *Acting Commissioner of Patents and Trademarks*